July 12, 1949.  R. W. JUSTICE  2,475,620
GRAPHIC SOLAR INSTRUMENT

Filed Nov. 14, 1945  2 Sheets-Sheet 1

Richard W. Justice INVENTOR.

BY Baldwin Yale

ATTORNEY.

July 12, 1949.  R. W. JUSTICE  2,475,620
GRAPHIC SOLAR INSTRUMENT
Filed Nov. 14, 1945  2 Sheets-Sheet 2

Richard W. Justice  INVENTOR.
BY Baldwin Yale
ATTORNEY.

Patented July 12, 1949

2,475,620

UNITED STATES PATENT OFFICE 2,475,620

GRAPHIC SOLAR INSTRUMENT

Richard W. Justice, Belvedere, Calif.

Application November 14, 1945, Serial No. 628,548

4 Claims. (Cl. 35—44)

This invention relates to graphic solar instruments.

Among the objects of this invention is to provide an instrument for predetermining the position of the sun relative to any given point lying along a particular parallel of latitude, at any given moment during the daylight hours, and which instrument will express the spatial relationship between the point and the sun at that moment in terms of the direction and path of the solar rays, and in terms of local apparent solar time for that given point.

Another object is to provide variations of such instruments, by means of which it will be possible to selectively predetermine the position of the sun relative to any given point whatever on the surface of the earth, at any time when the sun is visible from that point, and to express the spatial relationship between the sun and the given point at the given moment in terms of the direction of the solar rays and in terms of local apparent solar time for the given point.

Another object is to provide a transparent instrument which may be superimposed upon a drawing or other graph for utilizing predictable solar conditions throughout the hours of daylight throughout the days of the year.

Another object of this invention is to provide an instrument which will give the approximate slant and direction of the sun's rays or the sun's altitude and azimuth for localities at or near specified latitudes and for any longitude, at hourly intervals of local apparent time throughout the daylight hours each month of the year. It is commonly understood, for example in the almanacs and in nautical astronomy, that local apparent time is identical with local apparent solar time. For that matter, the simple term, apparent time, will be so understood.

This instrument as disclosed is susceptible to modifications of the various indices depicted on the base sheet and rotary disc, adapting it to selected geographical locations available in a set of such instruments.

The instrument is predicated on the following established and accepted astronomical premise:

That from any point on the surface of the earth the sun, whenever visible, appears to move across the sky substantially from east to west.

That to any stationary observer the altitude and azimuth of the sun change constantly throughout the day, and on each day are slightly different instant for instant, from the day preceding or the day following. At any given instant of time, altitude and azimuth of the sun, as viewed from any given point, will not be the same as altitude and azimuth of the sun as viewed from any other point. However, the sun's altitude and azimuth when viewed from any given point at a given time will be substantially identical to the sun's altitude and azimuth when viewed by another observer from any other point lying along the same parallel of latitude, at some instant of time earlier or later on that same day. If the second observer is directly westward of the first observer, any certain condition of altitude and azimuth will be manifest to him some specific amount of time later than the same condition was manifest to the first observer, and the interval of time between the instant when the position of the sun bears a certain specific relation to the first observer, and the moment when the position of the sun bears a substantially identical relation to the position of the second observer will be equal to the number of hours, minutes and seconds of longitude, not the distance, intervening between the meridians of the two observers. The converse of this is also true.

By definition, local apparent solar time, hereinafter abbreviated as L. A. S. T., for any point means time as determined by the position of the sun with relation to that point, or, astronomically, the hour angle of the sun with relation to that point, it follows that at each instant throughout the period of one revolution of the earth upon its axis that it is noon, L. A. S. T. for all points lying on some meridian of longitude, since from each of such points the sun appears higher in the heavens at that instant than it appeared one instant before, or after, and since such a condition occurs, by definition, only at noon, L. A. S. T.

If we properly define eleven o'clock a. m., L. A. S. T. for a given point as that instant of time precisely one apparent solar hour before noon, L. A. S. T., for that same point, and define one o'clock p. m., L. A. S. T. as that instant precisely one apparent solar hour later than noon, etc., it follows that any numerically expressed instant of L. A. S. T. for a given point applies also to all points directly north or south of the given point.

From all the foregoing it is apparent that when this instrument gives correct readings for the sun's altitude and azimuth for some particular point lying any where on the surface of the earth, in terms of L. A. S. T. for that point, that the same readings will apply to any other point lying along the same parallel of latitude, in terms of L. A. S. T. for each respective point. It is a further apparent that these same readings will apply to no other points on the surface of the earth, since an observer travelling instantaneously from one pole to the other in direct line along the surface of the earth would accomplish his journey within the same instant of L. A. S. T. for all points lying along that line, but would find himself in constantly changing relationship to the position of the sun.

A great number of instruments of the nature of this invention would be required to predetermine the direction of solar rays and the altitude and azimuth of the sun in terms of L. A. S. T. for all selected points, if extreme accuracy were required. Each instrument would serve only for points lying within a very narrow band of latitude. If the purpose of each instrument is such that a predetermined degree of inaccuracy is permissible, then the number of instruments required to serve for the entire earth can be limited. Each instrument may be calibrated to register correct readings for desired points along a selected parallel of latitude, but may also be used for points within a certain band of latitude centered about the selected parallel.

In this disclosure it is to be understood that all terms such as correct, identical, etc., shall be taken to mean to within limits set by the practical use for which this invention is intended; but the earth has certain involved minor eccentricities of movement relative to the sun which make the achievement of absolute accuracy inconsistent with the general purpose of the present invention.

The drawings illustrating this invention represent a particular version of the instrument calibrated for all points lying along the parallel of latitude approximately 37°30′ north of the Equator, and may be varied for other points by appropriate modification of the indices.

In the specification and drawings the invention is disclosed in its preferred form, but it may be embodied in modifications within the spirit of the invention as defined in the claims following the description.

Figure 1:
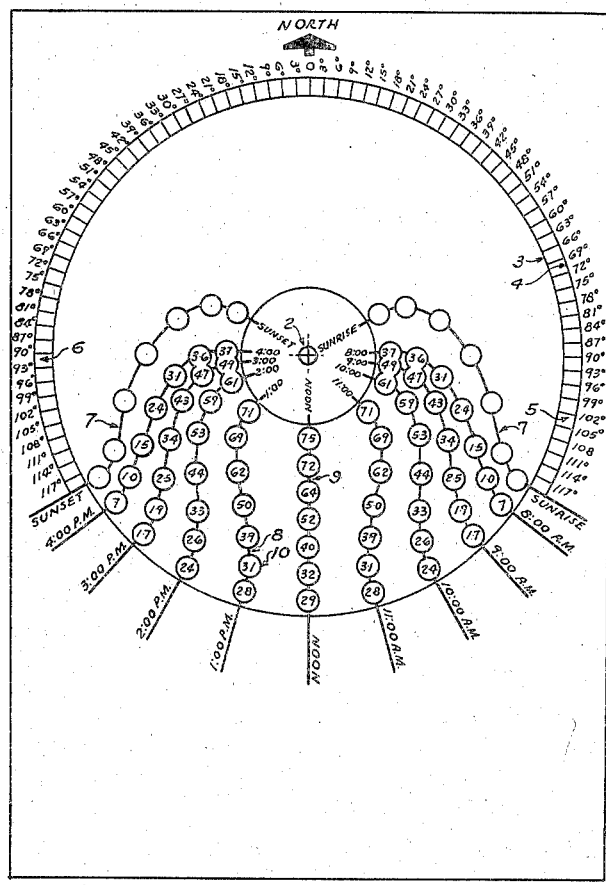
Fig. 1 is a plan view of the stationary base sheet having a graphic chart thereon, representing the horizon of the observer, in accordance with this invention.

In detail the structure illustrated in Fig. 1 comprises the rectangular base sheet 1 preferably of transparent material such as plastic, having the center hole 2 therethrough. This sheet has the concentric lines 3 and 4 serving as confining boundaries for graduated segments such as 5, 6, laid off in degrees from zero at the north to approximately 120 degrees east and west as on a common protractor. Each division in these segments represents three degrees and is appropriately marked with a numeral. The zero point is identified by the index marked North. A line through the center axis 2 passing through any part of segments 5, 6, would represent a continuation of the line of azimuth of the sun at some moment of some day; the center 2 is considered as the position of the observer, and sheet 1 represents the horizontal plane of the observer.

The lower portion of the sheet 1 between the ends of the segments 5, 6, is bounded by deviating curved lines such as 7 leading toward the axis 2 and marked at each end Sunrise and Sunset for the easterly and westerly line respectively.

The lower portion of the sheet is further divided by eight deviating curved lines such as 8 and one vertical straight line 9. Those curved lines easterly of the vertical center line 9 being identified at each end by hourly markings from 8:00 a. m. through 11:00 a. m., and those westerly being similarly identified by markings from 1:00 p. m. through 4:00 p. m. The straight north and south line 9 is identified by the word Noon.

Lines 7, 8 and 9 shall be referred to as "hour lines" hereinafter, as each of these lines is merely an identifying connection between the small numeral enclosing circles such as 10.

The center of each circle 10 represents a point which, considered in connection with the axis 2, forms one of a pair of the points which determine any particular radial line from 2. Each line so determined is the line of azimuth of the sun at some whole hour of L. A. S. T. on some day, and any line from the axis 2 passing through the center of any circle 10, represents the azimuth of the sun at Sunrise on some day, if the circle 10 is one of those lying along the line marked Sunrise. Any such radial line passing through another circle 10 represents the azimuth of the sun at 8:00 a. m. on some day if the circle 10 is one of those lying along the line marked 8:00 a. m. and so on.

Each numeral 10 indicates, in degrees, the slant of the solar rays as they intersect the horizontal plane tangential to the surface of the earth at the point where the observation is made.

Each numeral within some circle 10 lying along the line marked 8:00 a. m. represents the altitude, in degrees, of the sun at 8:00 a. m. of some day. Each such numeral within a circle 10 lying along a line marked 9:00 a. m. represents the slant in degrees of the sun rays at 9:00 a. m. on some day, and so on.

Figure 2:
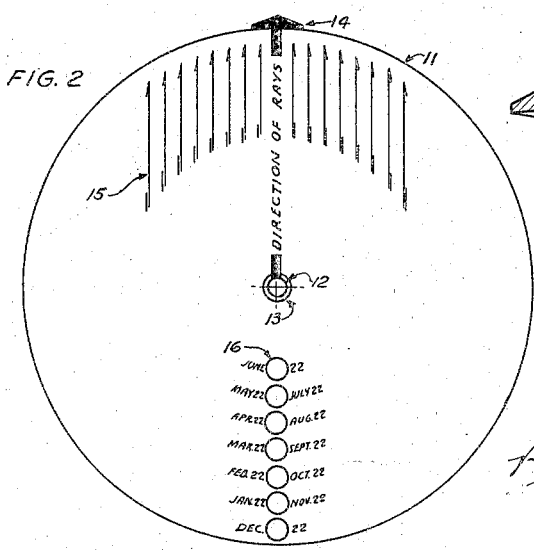
Fig. 2 is a calendar disc having date indices and ray directional indices thereon and adapted to be attached to the base sheet with its indices coaxial with the indices on the base sheet.
Figure 4:
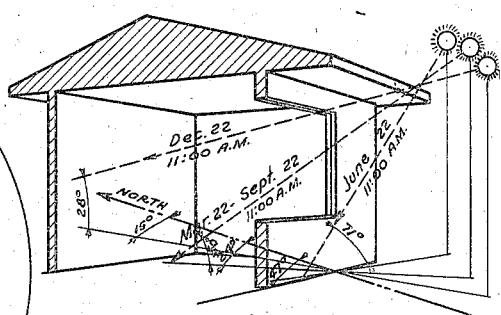
Fig. 4 is a diagrammatic forecast, in accordance with this invention, showing the direction of the sun rays at given dates and time.

The circular date disk 11 shown in Fig. 2 has the center hole 12, concentric with the axis 2, when superimposed on the base sheet 1. When assembled together by the eyelet 13, they form the complete graphic solar meter.

The small circles 10, beside being grouped along the various deviating hour lines such as 7, 8, and 9, are further located by being each a certain distance from the axis 2. Each small circle 10 intended to relate to a certain date is located at a fixed radial distance from the axis 2. The circle 10 closest to the axis 2 on each hour line 7, 8, and 9, relates to June 22. The circle 10 on each such hour line farthest from the axis relates to December 22, and the other groups of circles 10 jointly and severally relate to specific dates, with all circles which are the same radial distance from center 2 relating to the same date or dates.

Each circle 10 is so placed with respect to axis 2 that it identifies itself with a certain hour on a certain date; and is so placed that a line from its center through axis 2 bears a certain angular relation to that portion of the north and south line which lies below this axis and coincides with noon hour line 9. This angular relation and the numeral within the circle 10 are indices of certain known and accepted astronomical coordinates which apply to the geographical points for which the instrument is calibrated, and represent respectively the azimuth and altitude of the sun at a specific hour of L. A. S. T. on a specific date, for all points lying along the particular parallel of latitude for which the particular instrument is calibrated.

Fig 2 shows the transparent date disc 11, with the index arrow 14 and the spaced arrows 15 parallel to a line from the axis 2 to the index arrow 15, indicating the direction of the sun rays.

The circles such as 16 each represent a date, or, if so noted, each of two dates. This dual arrangement is possible because the astronomical cycle which governs the relative positions of the sun and the earth throughout the year is a semi-yearly cycle with extreme conditions of altitude and azimuth occurring at the mid-summer and mid-winter solstices, and with average conditions occurring at the vernal and autumnal equinoxes, so that any given condition of altitude and azimuth, with the exception of extreme conditions, such as the solstices, occurs twice each year.

The inner most circle 16 noted June 22 on the disc 11 is located precisely the same distance from the axis 2 as in the innermost circle 19 on each hour line on sheet 1 is located from this axis 2. The outermost circle 16 noted December 22 on disc 11 is located precisely the same distance from the axis as the outermost circle on each hour line on sheet 1 is located from the axis. Every circle such as 16 on the disc 11 is located as far from the axis as each of some corresponding group of circles 10, one of each group being on each hour line. If this disc is revolved about the axis 2 each circle in the series 16 may be brought into register with any one of a certain group of circles 10 and indicate the azimuth line that is considered as leading from the axis 2 through the registered circles, toward the sun, or opposite to the direction of the sun rays. The arrow 14 points in the direction in which the sun rays are travelling when they impinge upon the earth, or the architectural structure, or other plot under test.

Figure 3:
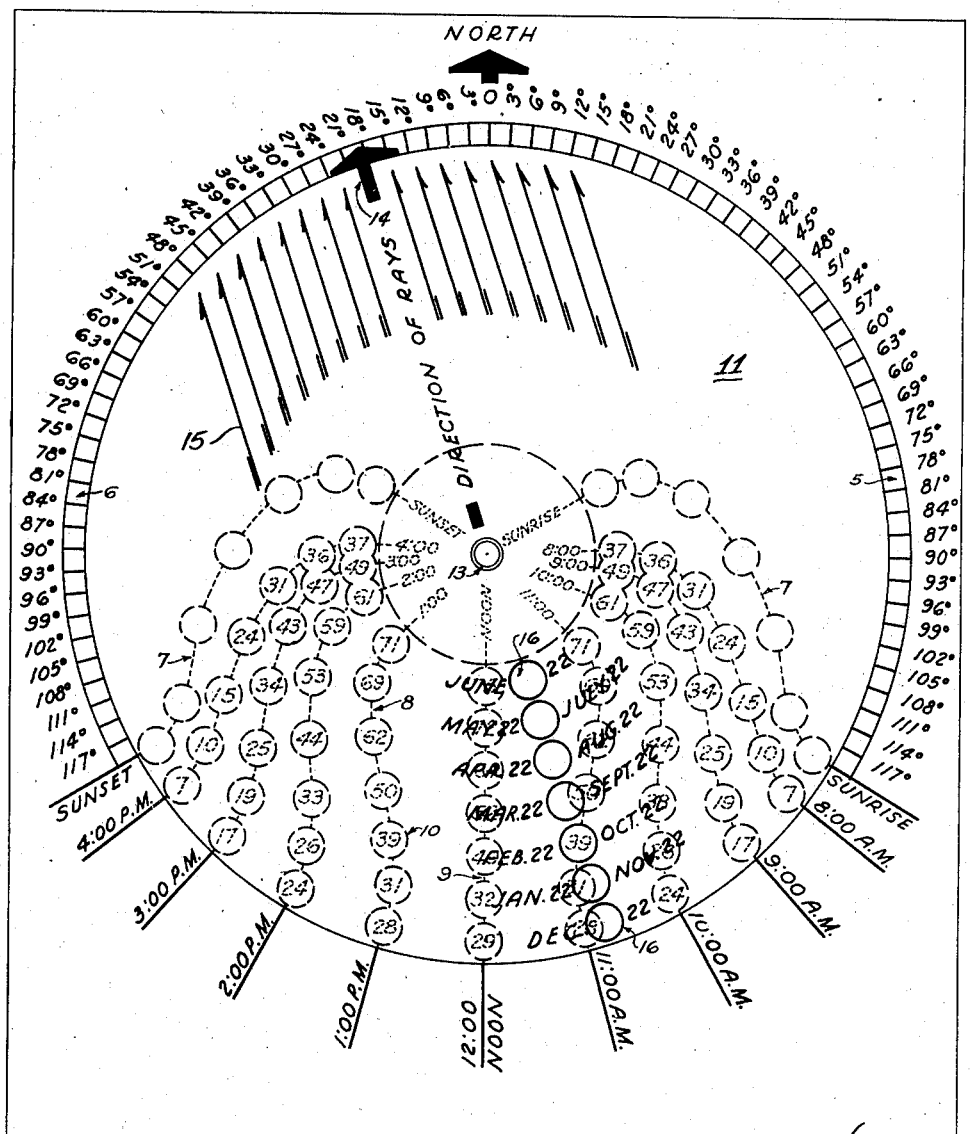
Fig. 3 is a plan view of the assembled base sheet and calendar disc in operative relation on an eyelet holding them in axial relation to each other. The underlying indices are shown in dotted lines, indicating the transparency of the instrument.

The instrument is operated substantially as follows: If it is desired to know the direction of the solar rays with respect to a meridian and their angular inclination to the horizontal plane on February 22 at 11:00 a. m., L. A. S. T. for some point lying along or relatively close to the parallel of latitude for which the particular instrument was designed—in this case approximately 37°30′ N., the disc 11 is rotated about the axis 2 until the circle denoted February 22–October 22 is registered with 39, the only circle on the 11:00 a. m. hour line on sheet 1 with which it can be registered, see Fig. 3. Arrow 14 is then seen to register about north 19° west on the graduated segment 6. The numeral 39 denotes that the sun rays are travelling in that direction as they approach the surface of the earth at a 39° angle of inclination to the surface of the earth. It will be seen from the readings, that on October 22 at 11:00 a. m., L. A. S. T., the relation of the solar rays to a given point on the earth is substantially the same as on February 22 at 11:00 a. m., L. A. S. T. To make similar determinations on any given date the dated circle on disc 11 is brought into registry with a circle on the selected hour line on sheet 1.

The present invention is not limited to any geographical area. The same general layout would apply to other selected bands of latitude, with instruments appropriately calibrated. By restricting the dates included to twelve, and by restricting the hours included to those shown, and by restricting the use of each instrument to a certain relatively narrow band of latitude, the instrument is kept within convenient size, and multiplicity of registry indices is avoided. The general structure and mode of operation of an instrument with closer time intervals would be substantially the same.

This invention provides a useful instrument for architects and others in planning homes, hospitals, schools, and other structures, enabling them to easily predetermine the exact angle at which solar rays would strike any part of the structure at any hour and day included within the scope of the instrument, without computations or guesswork. In such instances the transparent solarmeter would be laid on the ground or floor plan drawing with the North arrow on base sheet 1 pointing in substantial alignment with true north on the drawing. The instrument can be moved about to various parts of the drawing and operated as described, keeping the North arrow on sheet 1 always pointing parallel to true north on the drawing.

If the instrument is to be used independently of a drawing, its operation is the same, and the North arrow on sheet 1 is kept pointing in the direction of true north. By such use landscape gardeners can locate greenhouses, growing plots and trees to best advantage. Similarly purchasers of homes can know in advance of the seasons the solar conditions which will affect the home at any time.

Having thus described this invention and its mode of operation what I claim and desire to secure by Letters Patent is:

1. A graphic solar instrument comprising a base sheet having depicted thereon a North-Noon index line bisecting the axis of said sheet; graphic east and west protractor graduations on opposite sides of said North-Noon line in concentric relation to said axis; lateral Sunset and Sunrise lines radiating from said axis on the opposite sides of said North-Noon line; designated graphic radial hour lines interspaced on said sheet and dividing the space between said Sunset and Sunrise lines and indicating designated hours of daylight between said lines; graphic degree indices arranged on said sheet in deviating spaced relation between said axis and said hour lines respectively and progressively indicating the degree angles of the solar rays; a date disc pivotal on the said axis of the base sheet and having a solar ray directional graphic index depicted thereon selectively registering with said protractor graduations; and a series of radially alined dated graphic indices on said disc concentric with said axis and alined with said solar ray directional index for selectively indicating in degrees the angular slant of the solar rays on a selected date on said disc registering with a selected index among said graphic degree indices on said sheet.

2. A graphic solar instrument comprising a base sheet having depicted thereon a graphic North-Noon index line bisecting the axis of said sheet; lateral Sunset and Sunrise lines radiating from said axis on the opposite sides of said North-Noon line; designated graphic radial hour lines interspaced on said sheet and dividing the space between said Sunset and Sunrise lines and indicating designated hours of daylight between said lines; graphic degree indices arranged on said sheet in deviating spaced relation between said axis and said hour lines respectively and progressively indicating the degree angles of the solar rays; a date disc pivotal on said axis of the base sheet and having depicted thereon a solar ray directional graphic index; and a series of radially alined dated graphic indices on said disc concentric with said axis and alined with said solar ray directional index, for selectively indicating in degrees the angular slant of the solar rays on a selected date on said disc registering with a selected index among said graphic degree indices on said sheet.

3. A graphic solar instrument comprising a transparent base sheet having a circular dial depicted thereon; a graphic North-Noon index line bisecting the axis of said dial; graphic protractor graduations on opposite sides of said North-Noon line in concentric relation to said axis; graphic Sunset and Sunrise lines radiating from said axis beyond the periphery of said dial; designated graphic radial hour lines interspaced on said sheet and dividing the space between said Sunset and Sunrise lines and indicating designated hours of daylight between said lines; graphic degree indices arranged on said sheet in deviating spaced relation between said axis and said hour lines respectively and progressively indicating the degree angles of the solar rays; a transparent date disc pivotal on said axis on the base sheet and having a solar ray directional graphic index depicted thereon and selectively registering with said protractor graduations; and a series of radially alined progressively dated graphic indices on said disc concentric with said axis and alined with said solar ray directional index, for selectively indicating in degrees the angular slant of the solar rays on a selected date on said disc registering with selected index among said graphic degree indices on said sheet.

4. A graphic solar instrument comprising a base sheet having depicted thereon a North-Noon index line bisecting the axis of said sheet; lateral Sunset and Sunrise lines radiating from said axis on the opposite sides of said North-Noon line; designated graphic radial hour lines interspaced on said sheet and dividing the space between said Sunset and Sunrise lines and indicating designated hours of daylight between said lines; graphic degree indices arranged on said sheet in deviating spaced relation between said axis and said hour lines respectively and progressively indicating the degree angles of the solar rays; a date disc pivotal on said axis of the base sheet and having a solar ray directional index depicted thereon; and a series of seven radially alined graphic date indices on said disc concentric with said axis and alined with said solar ray directional index, the first and last of said date indices being graphically identified by the months of June and December respectively, and the intermediate date indices by the months of May and July, April and August, March and September, February and October, and January and November respectively, in succession and cooperating with said degree indices for selectively indicating in degrees the angular slant of the solar rays on a selected date on said disc registering with a selected index among said graphic degree indices on said sheet and visible through said disc.

RICHARD W. JUSTICE.

REFERENCES CITED

The following references are of record in the file of this patent:

UNITED STATES PATENTS

| Number | Name | Date |
|---|---|---|
| 990,764 | Morse | Apr. 25, 1911 |
| 1,742,781 | Ott | Jan. 7, 1930 |
| 1,932,609 | Swartz | Oct. 31, 1933 |
| 2,397,063 | Van Zandt | Mar. 19, 1946 |